United States Patent [19]

Greenbaum

[11] 4,255,898
[45] Mar. 17, 1981

[54] MODULAR PLANT DEVICE

[76] Inventor: George Greenbaum, 790 Boylston St., Boston, Mass. 02199

[21] Appl. No.: 923,052

[22] Filed: Jul. 10, 1978

Related U.S. Application Data

[62] Division of Ser. No. 763,821, Jan. 31, 1977, abandoned.

[51] Int. Cl.³ .............................................. A01G 9/02
[52] U.S. Cl. ........................................ 47/85; 47/59; 47/79; 47/86; 220/22.3; 229/15
[58] Field of Search ................ 47/85, 86, 66, 79, 18, 47/63, 64, 59, 62; 220/22.1, 22.2, 22.3; 229/15, 42

[56] References Cited

U.S. PATENT DOCUMENTS

| | | | |
|---|---|---|---|
| 2,233,938 | 3/1941 | Jones | 220/22.3 |
| 2,502,910 | 4/1950 | Wilcox et al. | 47/18 |
| 3,006,818 | 10/1961 | Lappala et al. | 47/59 X |
| 3,954,202 | 5/1976 | Petrick | 220/22.1 |
| 4,035,950 | 7/1977 | Anselm | 47/59 |
| 4,120,119 | 10/1978 | Engel | 47/86 |
| 4,166,341 | 9/1979 | Vestrgaard | 47/59 |

FOREIGN PATENT DOCUMENTS

| | | | |
|---|---|---|---|
| 922106 | 3/1973 | Canada | 47/64 |
| 257501 | 6/1912 | Fed. Rep. of Germany | 47/68 |
| 1429618 | 3/1969 | Fed. Rep. of Germany | 220/22.3 |
| 2289110 | 7/1976 | France | 47/66 |
| 7608102 | 1/1977 | Netherlands | 47/66 |
| 183928 | 5/1936 | Switzerland | 47/85 |
| 340461 | 9/1959 | Switzerland | 220/22.3 |
| 467955 | 6/1937 | United Kingdom | 47/85 |
| 1162188 | 8/1969 | United Kingdom | 47/79 |
| 468613 | 7/1975 | U.S.S.R. | 47/85 |

*Primary Examiner*—Steven A. Bratlie
*Attorney, Agent, or Firm*—Thompson, Birch, Gauthier & Samuels

[57] ABSTRACT

A channel culture device for plant systems which comprises a plurality of longitudinal growing channels, for growing the primary plants, and service channels, which aid the growing channels. The channels alternate and fluids, water and air, pass laterally between the growing and service channels which enhance plant growth.

7 Claims, 22 Drawing Figures

MODULAR PLANT DEVICE

This is a division of application Ser. No. 763,821 filed Jan. 31, 1977, now abandoned.

BACKGROUND OF THE INVENTION

Channel culture devices which provide multiple plant growth channels of indefinite length but of shallow depth and narrow individual width have the most potential for increasing the world's food supply. These channels provide maximum plant production for a given supply of fertile soil, water, fertilizer and insecticide, some or all of which are scarce and at an extreme premium at many parts of the world. The growth channels have a limited volumetric area that can be made just sufficient for the full root development of any specified plant so that optimum availability of nutrients and water to the plant is obtained. Further the isolation of the channels prevents the leaching and escape of the available supply of nutrients and water into the underlying soil. Isolation also simplifies the problems of cultivation and of the control of pests, disease, and weeds.

Various design proposals have been made, of which some are disclosed and claimed in my co-pending U.S. Patent Application Ser. No. 512,518 now abandoned filed Oct. 7, 1974 for "Channel Culture Device" and in my recently issued U.S. Pat. No. 3,987,585 issued Oct. 26, 1976 for "Modular Channel Culture Device".

Many modular configurations have thus been suggested. It has been found in practice that most modular channel configurations incur two major drawbacks. Typically they are of a predetermined size and to achieve flexibility of sizes within a particular total assembly has proved cumbersome and expensive. Modular plant devices which have the ability to be extended both in length and breadth through some type of interfitting or interlocking connections have not exhibited the necessary structural flexibility to readily form modules of various sizes.

Further, most configurations have resulted in an environment for containing and supporting the plants and plant support systems which allow a modest amount of flow of water downwardly from the top surface and along the walls. Lateral flow of air and water into and from the plant support system in a channel as a practical matter, did not occur. These concepts were then felt not to be important in that the total amount of nutrients required to maximize plant growth could be carefully controlled since there would generally be no leaching from the culture device. It has been found that this non-leaching concept although theoretically sound, had attendant problems which in many instances outweighed the advantages. For example, when used in small scale, i.e. home, small garden areas, etc. there is a tendency by the user to over water or over feed. The accumulated water could not drain properly, being sealed on three sides, and this condition deleteriously affected plant growth. In large scale operations unexpected rain fall results in the same problem.

My recent work in this area has established that the concept of increased aeration of the plant support system while providing some structure to minimize complete leaching has overcome the aforementioned problems.

BRIEF SUMMARY OF THE INVENTION

The present invention overcomes these problems and provides for a plurality of growing channels and adjacent service channels which growing channels have controlled drainage and enhanced aeration both vertically and laterally of a plant support system within which a plant is disposed. Furthermore the basic components of the system may be manipulated and assembled to form any number and size of service and growing channels, one in communication with the next.

My invention broadly comprises at least one growing channel such as an elongated trough which has a floor and two walls characterized by being air and water permeable. The growing channel is flanked by two service channels which function in combination with the growing channel to allow fluids, such as air and water to communicate laterally with the plant support system in the growing channel.

My invention in one embodiment comprises a modular plant channel having at least first and second trough-shaped members, the walls of which are air and water permeable. The end of a second member is adapted to engage sealingly the end of the first member to extend the troughs longitudinally. A support member is disposed on the bottom of the trough to define a chamber, said member characterized by being dimensionally stable and air and water permeable.

The troughs are placed in side-by-side relationship and clip-like members are provided whereby the adjoining upper edges of the troughs may be secured together and the breadth of the entire modular channel device is increased. In one aspect of the invention, the walls of the trough are shaped to provide superior structural strength in reference to planar walls defining a plurality of channels and are characterized by being fluid permeable. Preferably the walls are corrugated whereby the total surface area of a channel wall is increased dramatically in surface and in reference to a planar wall and the alternating roots and crests form individual channels to enhance the downward flow of the fluids into the channel.

In another aspect of the present invention, the trough-like members are characterized by a floor and upright arms. The arms include a series of parallel vertically aligned slits. A film is draped over troughs which are arranged in parallel relationship. Fluid permeable partitions are inserted into the slits where desired and engage the film thereby securing the film to the troughs and forming a bottom. Adjacent edges of the partitions are abutted, one to the other, to form a wall which extends transverse to the direction of the longitudinal axis of the trough-like members. By selecting where the partition members are inserted into the vertical slits of the troughs the spacing of alternating service and growing channels is defined. Partitions may be disposed substantially normal to a longitudinal axis of a channel to subdivide a channel to isolate particular types of plants.

The partition preferably is fluid permeable.

Accordingly, an invention is provided which overcomes the difficulty of prior art channel culture devices which has ease of assembly and flexibility and most importantly forms service channels in communication with growing channels to maximize the efficacy of the soil, water and nutrient requirements for each type plant to be grown.

DESCRIPTION OF THE PREFERRED EMBODIMENT

The preferred embodiment of the invention will be described in reference to FIGS. 1–9 and for a modular plant device particularly suitable for home or small scale use.

Figure 1:
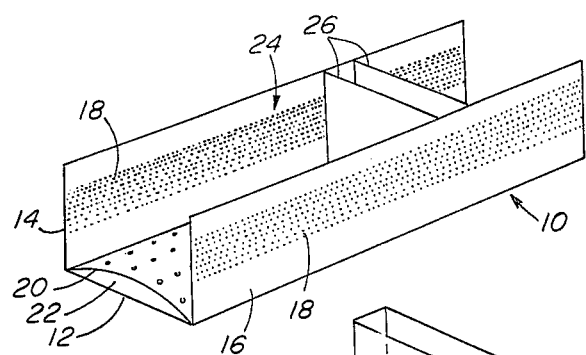
FIG. 1 is a perspective view of a modular plant channel illustrating one embodiment of the present invention.
Figure 3B:
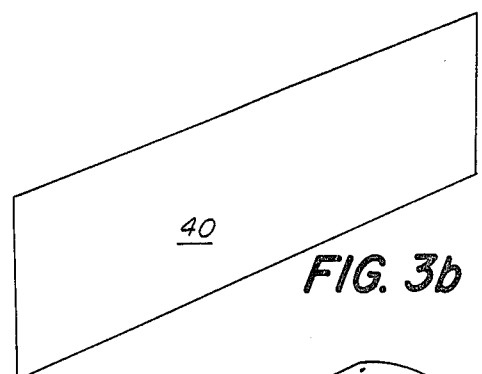
FIGS. 3a and 3b are perspective views of alternative partition members.

Referring to FIG. 1, a trough-like member 10, of a substantially U-shaped configuration, is shown. This configuration allows the member to rest on any substantially flat surface. The material of construction of such member is basically of such strength that when used as a growing channel it can retain between its opposed walls the plant support system in a wetted condition together with the forces acting on the walls by any plant which may be grown in the particular system. The member 10 comprises a floor 12 and vertically upright opposed walls 14 and 16. The walls 14 and 16 are characterized by water and air permeable sections 18. If desired both walls 14 and 16 may be entirely water permeable and the floor 12 may also have the same properties. These conditions being satisfied, the trough 10 may be made from any suitable material. If part of the trough is water impermeable then high and low density polyethylenes, high impact styrene, concrete, etc., may be used for that portion. The composition of the water permeable portions may be of any conventional material such as a sieve, porous ceramic, glass or sintered metal. Cellular material consisting essentially of interconnected individual cells of the open cell or breathable type that is, permits the passage of gas or liquid therethrough by a tortuous path, may be used, particularly where organic foam or cellular material wherein the open cells represent over 90% of the cells. For example, the materials may comprise an organic or cellular foam of the flexible, semi-rigid or rigid type such as urethane, vinyl or elastomer foams. Such materials are readily available and need not be described in detail.

If normally water impermeable materials are used the material may simply be perforated with the perforating arranged in any uniform or non-uniform array and of uniform or non-uniform size and of the same or different geometric configurations, or any combination of the foregoing. In this preferred embodiment high density-rigid polystyrene is used to form the trough 10. The walls 14 and 16 are perforated over a portion of the surface to form the sections 18.

Figure 2:
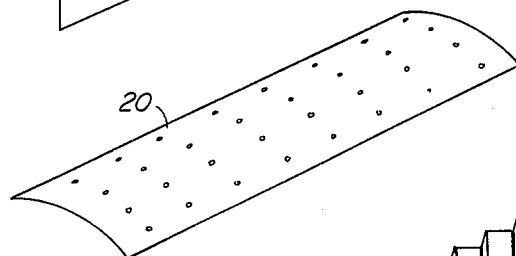
FIG. 2 is a perspective view of a support member.
Figure 5:
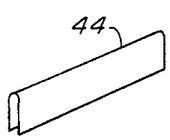
FIG. 5 is a perspective view of a clip.

In FIG. 2 an arcuate support member 20 is illustrated. The member 20 is placed in the trough 10 and the edges of the support member 20 engage, such as by sealing with calking compound, the trough 10 where the walls 14 and 16 meet the floor 12. The arcuate or concave surface of the member 20 is such that a chamber 22 is defined between the lower surface of the member 20 and the upper surface of the floor 12. This chamber 22 provides a fluid permeable surface for supporting the plant support system as will be described. Preferably the support member 20 is perforated rigid polystyrene.

The member 20 may assume a solid configuration such as for example a block of interconnected cellular foam material. Its function is twofold to support the plant support system to insure the free flow of air underneath and into the system; and to allow excess water added to the system to flow away from the system.

Referring to FIG. 1, the trough 10 functions as a growing channel 24. Partitions 26 such as rigid perforated polystyrene primarily, in this embodiment, function to isolate separate plants. The term "service channel" as used herein generally connotes longitudinal channels flanking the growing channels. It is also intended to include transverse partitions which serve the same function.

The two partitions 26 are shown in spaced apart relationship defining an air pocket therebetween. The bottom edges of the partitions 26 may be arcuate to conform to the concave surface of the support member 20. The bottom edge may be straight and the edge of the support member 20 abutted against the partition.

Figure 6:
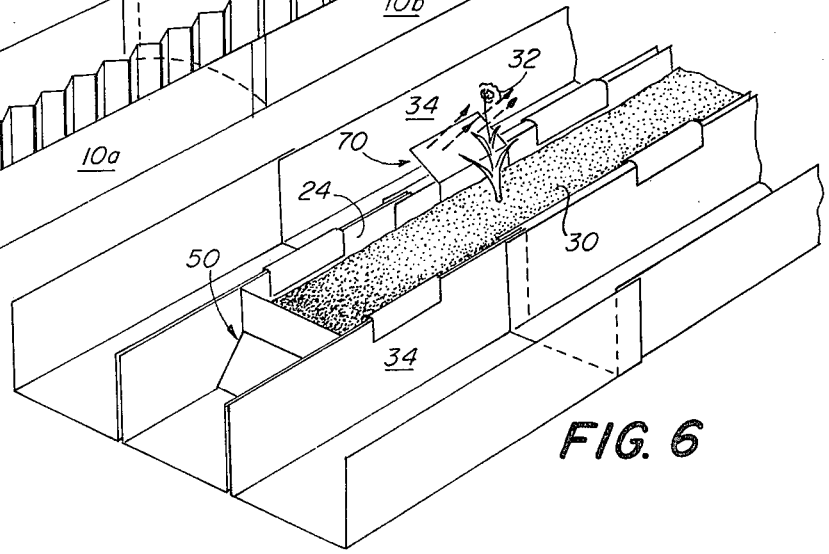
FIG. 6 is a perspective illustration of trough-like members joined transversely.

Referring to FIG. 6, when fully assembled a quantity of soil or other plant support medium 30 and plants 32 are placed in the growing channels 24. Service channels 34 are troughs of similar shape and materials of construction to the growing channels 24. Service channels 34 flank the growing channels 24 and all channels are arranged in side-by-side relationship. Depending upon the use of the service channel 34 they may be equal in width or down to one tenth (1/10) the width of the growing channel 24. The size and spacing of the apertures in the wall section 18, support member 20, and partition 26 may vary to accomodate the particular plants being grown. The member 20 and partition 26 may be perforated over their entire surface or only a portion thereof. If open cell material is used the degree of water and air flow therethrough may be controlled by controlling the number, spacing and size of the open interconnected cells.

Figure 4:
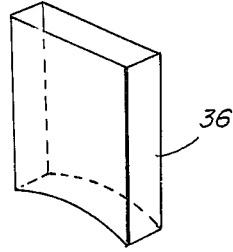
FIG. 4 is a perspective view of an end member.

In FIG. 4 a rectangular-shaped end piece 36 is shown which may or may not be fluid permeable. The bottom is arcuate and engages the upper surface of the support member 20. The outer walls of the piece 36 engage the inner walls of the trough 10. Basically the piece 36 closes off the end of either a growing channel and/or a service channel.

Figure 3A:
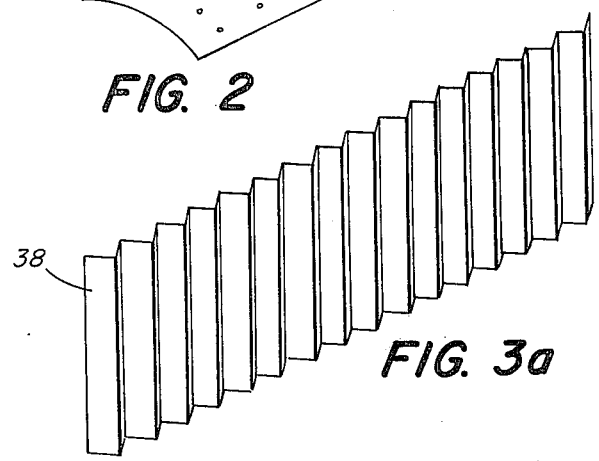

The height of the plant support system is controlled in one way by the amount of soil added in a growing channel 24. The width of the growing channel is determined initially by the fixed position of the walls 14 and 16. The width and height may be varied by insertion of a wall section 38 (or sections) as shown in FIG. 3a or 40 of FIG. 3b and in FIG. 7. Both of these sections are air and water permeable. The pleated construction of FIG. 3a increases the surface area in reference to the planar section of FIG. 3b but most importantly the channeling allows the fluid flow to flow downwardly and laterally into the plant support system. These sections are fabricated from any of the materials as described above, i.e., perforated, foamed, partially perforated, fully perforated, etc.

To increase the height a pair of wall sections are used within a growing and/or service channel. For example a pair of sections 38 may be placed within a growing or service channel adjacent the walls thereof. The insertion of the walls such as 38 forms an important feature of my invention. The walls may be of any height and when paired allow enhanced flexibility. For example if there were twenty-four (24) channels, walls 38 of a first height say two feet (2') could be placed in a first growing channel, walls of a second height say, one foot (1'), could be placed in second growing or service channel. Walls of a third height, say six inches (6") could be placed in a third channel and so on. The different heights (depths) provide unlimited flexibility in the selection of the plants to be grown. This feature is also applicable to the embodiments of the invention represented in FIGS. 11-13 and FIGS. 14-19. Wall section 38 is particularly suited for the embodiment of FIG. 11 in that the corrugations of the wall 38 mesh with the corrugations of the walls 104. In any of the embodiments if planar wall sections 40 are adjacent corrugated walls, such as 104, vertical, triangular-shaped flow passages are formed. The same results are found when corrugated wall sections 38 are adjacent walls such as 14-16 of FIG. 1 and 212 of FIGS. 15 and 18. When wall sections are used which increase the height of a channel appropriate sized (i.e. having equal height with the wall section) end members such as 36 of FIG. 4; 112 of FIG. 12 and 230 of FIG. 16, to close the channel are used.

Figure 7:
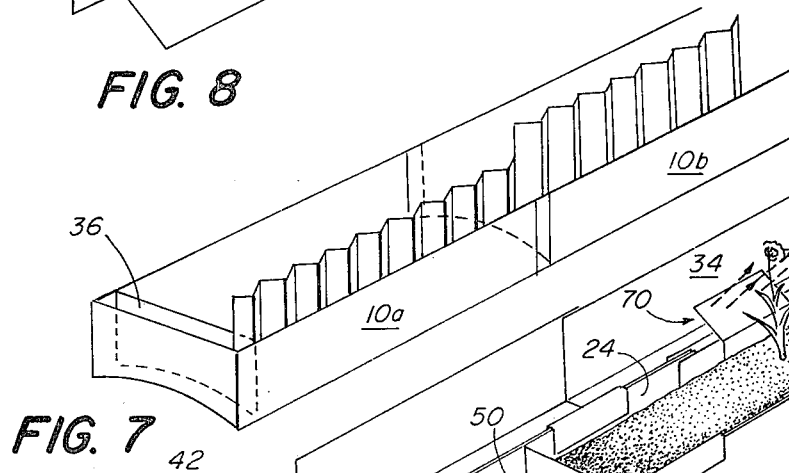
FIG. 7 is a perspective illustration of a plurality of trough-like members joined longitudinally.

Referring to FIG. 7 the troughs 10 are joined longitudinally by frictionally engaging in telescopic relationship one end of a first trough 10a within the next end of the second trough 10b and so on. When assembled in this manner the lateral forces exerted by the soil particularly when the growing channel is disposed across the joined ends, insures a friction-tight fit. As shown, an end piece 36 simply forms the termini of the troughs 10. The troughs 10 are joined transversely by means of the clips 44 illustrated in FIG. 5 and shown in FIG. 6. In FIG. 6 a plurality of troughs are shown joined longitudinally and transversely. Each alternating trough functions either as a growing channel or a service channnel.

Figure 8:
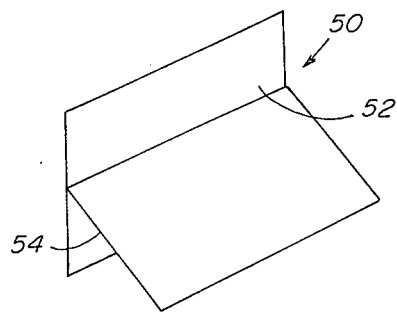
FIG. 8 is a perspective view of a root deflecting unit.
Figure 9:
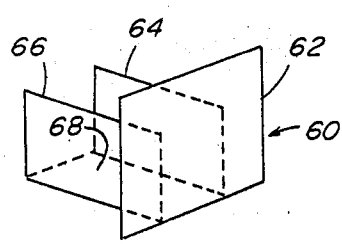
FIG. 9 is a perspective view of a seedling transport unit
Figure 10:
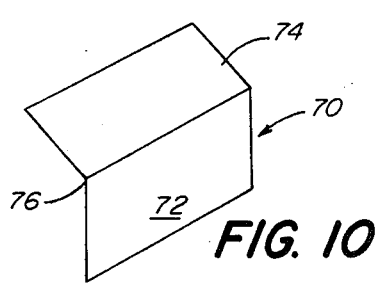
FIG. 10 is a perspective illustration of a water and sun light member.

Additional structures useful with my invention are illustrated in FIGS. 8, 9 and 10. Although described in reference to the channel device of FIGS. 1-7 these structures may be used with the one and the other aspects of the invention illustrated in FIGS. 11-14 and 15-19 respectively.

A root deflector 50 is shown in FIG. 8 comprising a vertical member 52 and an angular projection 54 which acts as a deflector of the plant roots. The deflector may be fluid permeable or impermeable as desired. As used it is disposed in the growing channel 24 of FIG. 6.

Referring to FIG. 9 a seedling transport unit 60 is shown having a back panel 62, two sides 64 and 66, and a floor 68. As used, it is disposed in a growing channel 24. The side panels 64 and 66 are within the outer dimensions of the back panel 62. The units 60 are inserted into the growing channel 24 and filled with growing medium. The units are abutted forming isolated cells to insure the root systems of adjacent plants do not become entangled. The units 60 may be removed individually or collectively when the plant has grown to sufficient size. A water and sunlight member 70 is shown in FIG. 10 comprising a depending portion 72 and deflector portion 74, both joined at bend 76. The portion 72 is inserted in a growing channel 24 as shown in FIG. 6 and water is deflected toward the plant and sunlight is reflected onto the plant as shown in dotted lines.

The above-described modular plant device and the following described devices are capable of being manipulated in many different ways as an entity.

The ability to place the partitions 26 and/or wall sections 38 and/or 40 in any position allows the structure to accomodate any size area of plant growing surfaces and the spacing configuration of the channels allows flexibility in enhancing the micro-climate of the growing plants. Particularly the alternating of the growing channel with an adjacent service or non-growing channel, primarily longitudinally but also transversely, allows control, to a useful degree, of the amount of air, water and nutrients available to the plant, since the separating walls are adequately perforated to allow free passage of these fluids.

The beneficial effects of the nutrient water and oxygen needs of the plants within each specific growing channel, are realized through the judicious use of the adjacent interconnected service channels. Further, by controlling the volume of the growing medium, one can minimize the use of toxic fungicides, herbicides or pesticides and maximize the use of the inoculents such as rhizobia, ozotobacters and mycorrhizae.

A service channel may be filled with gravel, sand, vermiculite, peat moss or mixtures thereof, to accomplish the above transfer. The degree of porosity can be varied. Further, the service channel may be used to grow special fertilizing or protection plants. For example, a suitable legume which makes nitrogen compounds from the air can supply needed nitrate to the growing channels that flank it. Also certain plants, such as garlic or marigolds whose roots exude specific chemicals can be very beneficial to their neighbors by controlling known pathogenic conditions.

Figure 11:
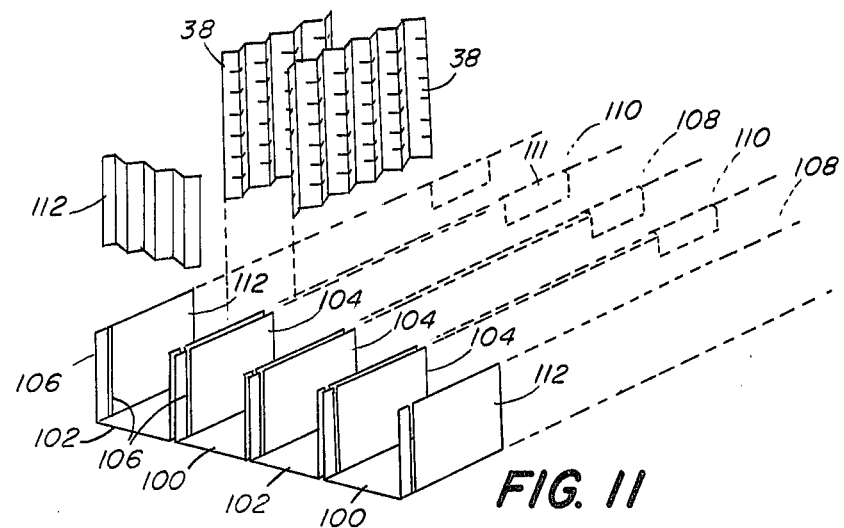
FIG. 11 is a perspective illustration of a channel device of one aspect of the invention.
Figure 12:
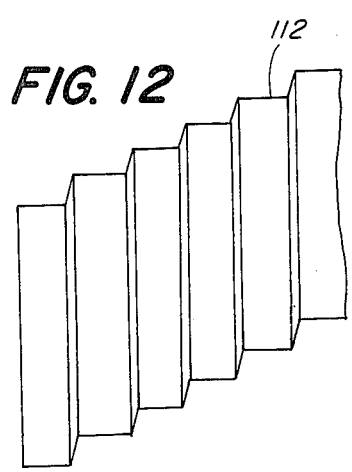
FIG. 12 is a perspective view of an interior wall of the device of FIG. 11.

In FIG. 11 a plurality of alternating troughs 100 and 102 are illustrated. Each trough has a floor and substantially upright walls 104. The ends of the walls 104 are characterized by slots spaced apart from the ends, the slots 106 of opposed walls 104 in alignment. The troughs 100, 102 are extended longitudinally by joining the troughs end-to-end in telescopic relationship as described for FIGS. 1–7. The service and growing channels 108 and 110 respectively, are secured side-by-side to any extent desired by clips or clamps 111. The ends of the troughs 100, 102 (or channels) are closed by inserting walls 112 such as shown in FIG. 12, in the slots 106. The materials of construction for this embodiment may be the same as for the channels of FIGS. 1–7. As shown, the perimeter walls 112 are non-perforated. All interior walls 104 are perforated.

Figure 13:
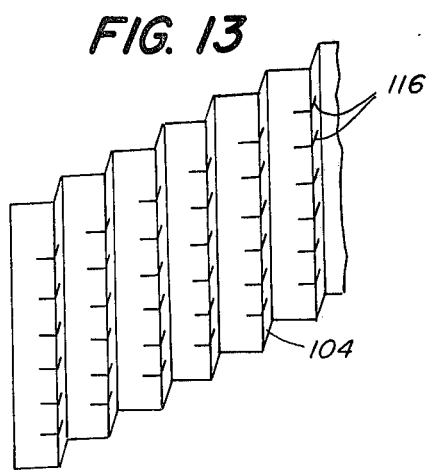
FIG. 13 is a perspective view of an exterior wall of the device of FIG. 11.

The configuration of the inserted wall section is preferably corrugated. As shown in FIGS. 11 and 13 all wall sections are corrugated with the roots and crests being perpendicular with respect to the floor of the trough. Other designs may be used which increase the surface area but more importantly provide structured rigidity and channeling. The roots and crests may alternate in opposed diagonal relationship to form a matrix of diamond-shaped protuberances, uniform or non-uniform extending into or away from the growing channels. Other geometric configurations will suggest themselves to those skilled in the art. In this embodiment wall sections 38 of the same or varying sizes may be received within all growing and/or service channels adjacent the opposed walls of the channels.

The corrugations endow the wall sections with great resistance to the lateral pressure of the wetted plant support system. This eliminates the need for stiffening members to prevent buckling. The roots and crests of the wall sections 38 define channels which in combination with the perforations 116 and walls 104 allow downward and lateral fluid flow between adjacent channels. It is to be understood that when the walls of adjacent channels are abutted the perforations are in register. The perforation or holes 116 of the sections 38 are shown as solid lines. Shown in telescopic perspective in FIG. 11 are two wall sections 38 which may be placed in the channel 110 to increase the height of the channel.

Figure 14:
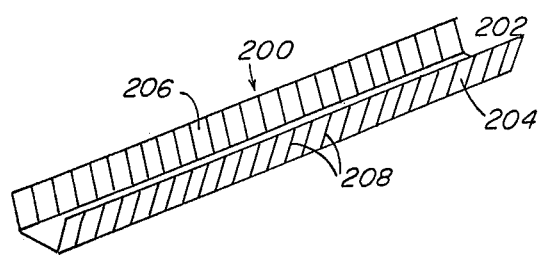
FIG. 14 is a perspective view of an alternative embodiment of a trough-like member.

Referring to FIGS. 14–19, a further aspect of the invention is shown. This embodiment is particularly applicable for a large scale modular plant device assembly. Referring to FIG. 14 a trough-like member 200 is shown having a floor 202 and opposed vertically disposed sides 204 and 206. The sides are characterized by a plurality of equally parallel spaced slits 208 in alignment with corresponding slits on the opposed wall. The troughs 200 are water impermeable such as wood, metal, plastic, reinforced concrete, etc.

Figure 15:
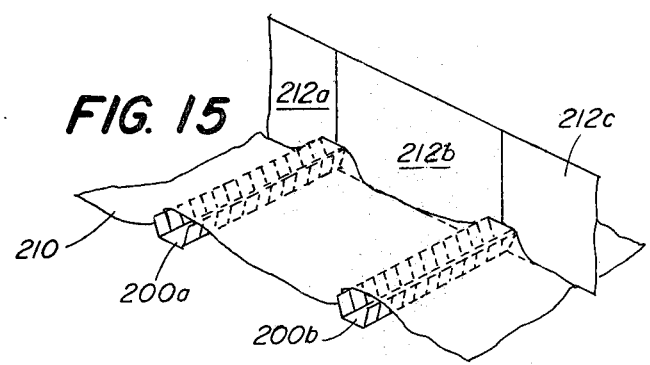
FIG. 15 is a telescopic perspective view of a plurality of trough-like members, sheet material and partition members.

Referring to FIG. 15, a plastic film 210 such as polyethylene or any suitable material such as disclosed in my copending application, Ser. No. 512,518 now abandoned, filed Oct. 7, 1974, is then draped or festooned over the troughs 200 in a continuous unbroken web. The troughs are arranged in side-by-side parallel relationship. A partition 212a is adapted to be pushed down into the one slot 208 of a first trough 200a carrying the film with it; and an opposed slot 208 of an adjacent trough (not shown). A second partition 212b is forced into the other slot 208 of the other arm of the trough 200a and into one slot of the arm of the trough 200b. The ends of the partition walls abutting in the middle of the troughs 200. This sequence is repeated until the desired number of parallel channels are formed which is shown most clearly in FIG. 18. Because of the spacing of the slots 208 in the troughs 200 it is obvious that there can be many different channel arrays limited only by the length of the troughs. The outside channel could be a service channel of a predetermined width followed by a growing channel of any desired width followed by a service channel, etc.

Figure 17:
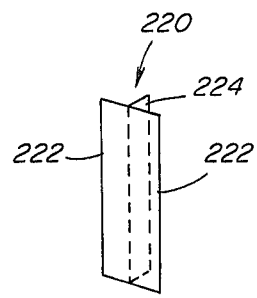
FIG. 17 is a perspective view of a rib member.

To insure the dimensional integrity of an assembled module vertical flanges 220 such as shown in FIG. 17 are provided and are substantially T-shaped in form. The sides 222 of the flanges are inserted into the slots 208 with the rib 224 opposite the side of the partition. The flanges 220 in FIG. 18 engage the partition 212 where the partitions join and where else a trough 200 is placed. Preferably flanges 220 will be placed where required to engage dimensional stability. If desired the rib 224 may contact the partition 212 directly.

Figure 16:
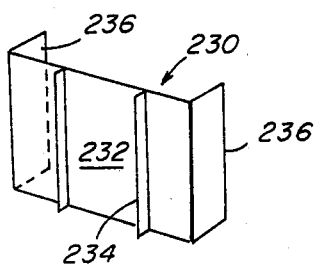
FIG. 16 is a perspective view of an end member used with the trough of FIG. 14.
Figure 19:
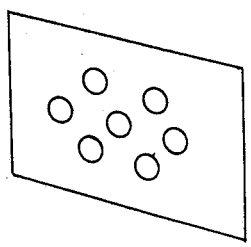
FIG. 19 is an alternative view of a partition member.
Figure 18:
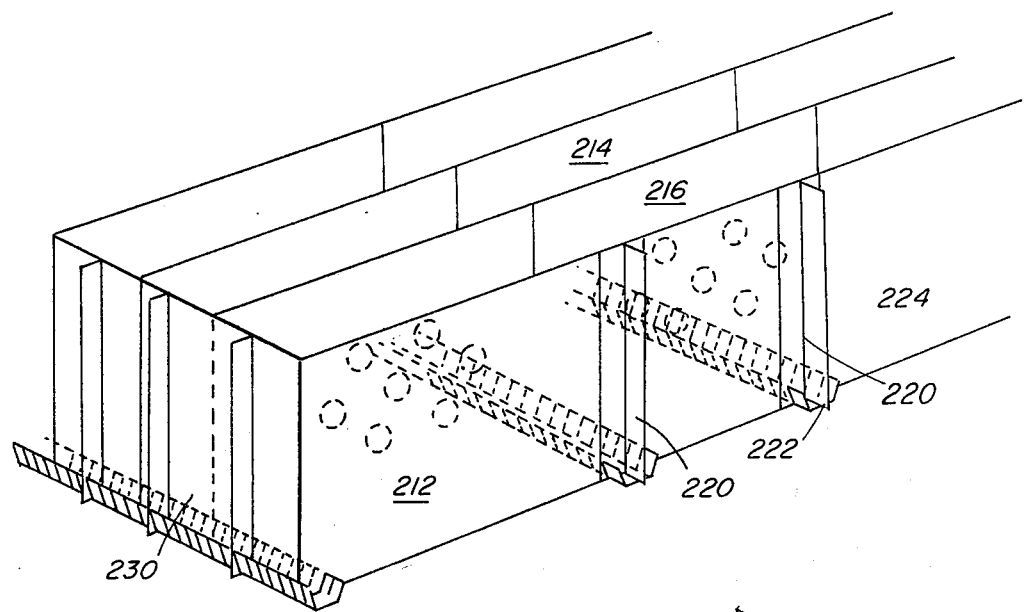
FIG. 18 is a perspective illustration of a plurality of troughs of the alternative embodiment of the invention in an assembled state.

End plates 230 are shown in FIG. 16 comprising a back 232, ribs 234 and edges 236. The edges 236 may be received within or without a channel 214 but in engagement with partition members 212. When assembled as shown in FIG. 18, the ribs 234 engage a slot 208 and the sides 236 also engage slots 208 closing the end of the growing channels 214 and service channels 216. The channels 214 and 216 are defined by the partitions 212 and film 210. A partition 212 is suitable for use with this aspect of the invention as illustrated most clearly in FIG. 19. The materials of construction are the same as for the preferred embodiment, regarding the air and water permeability, perforation, foams, etc. Also the channels are alternated in use, i.e. service and growing channels. The depth of a growing channel depends upon the amount of plant support system, the length and breadth determined by the number of troughs and the spacing one to the next and the breadth by the number and spacing of the slots.

In any of the above-described embodiments a cluster of channels which form the channel culture device may be converted to a greenhouse-like structure, particularly the channels as shown in FIGS. 11–13.

Figure 20:
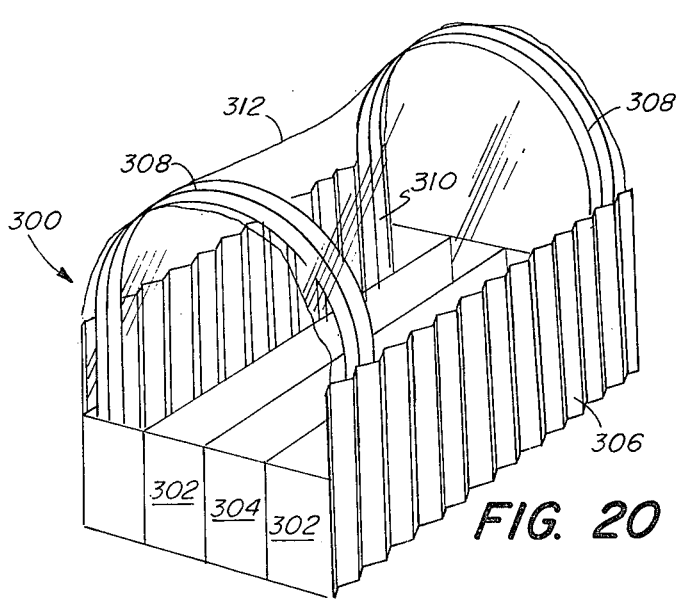
FIG. 20 is a perspective illustration of a further alternative embodiment of the invention showing a greenhouse-like structure; and, FIG. 21 is a perspective view partly broken away of a manner of securing the film and arches of FIG. 20 to a modular plant device.
Figure 21:
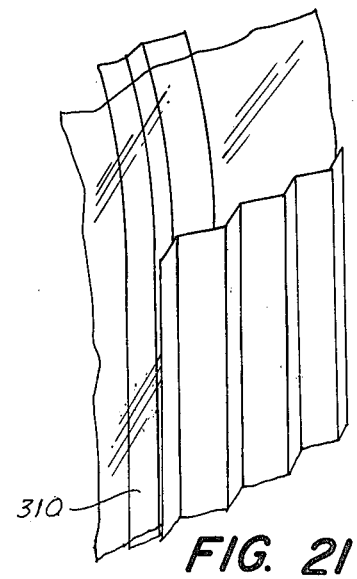

In FIG. 20 a modular plant device 300 comprising growing and service channels 302 and 304 having corrugated walls is shown. The external or perimeter corrugated walls 306 define the sides of the channel culture device 300. A plurality of rod-like arches 308 span the device 300 and are secured at their ends 310 to the exterior or perimeter walls 306. A sheet of film 312 such as high density polyethylene or any suitable film such as disclosed in my aforementioned copending application is draped over the arches 308 in such a manner as to completely enclose the device 300 as in a greenhouse.

the manner of securing the arches to the device 300 is shown more clearly in FIG. 21. The outer surfaces of the ends 310 of the arches 308 are shaped, corrugated, to mate with the corrugations of the exterior walls 306. In assembling the structure the arches 308 are deflected inwardly the ends inserted in the device 300 adjacent the inner surface of the exterior walls and then released, the bottom of the ends 310 contacting the floor of the channel. The normal outward bias of the arches results in the ends frictionally engaging the exterior walls and securing the arches to the device 300. Of course the ends may be secured by suitable fasteners such as bolting, clamping, etc. To secure the film it is placed between the arch ends and the inner surface of the interior walls. The arches 308 may be sectional to allow the arches to be expanded or contracted to accomodate different sized devices 300.

Any of the above features, corrugated walls, etc. employed with a particular aspect of the invention may be employed with any other aspect of the invention.

Having described the invention, what I now claim is:

1. A modular plant device which comprises at least two longitudinal troughs arranged in parallel relationship, the walls of each of said troughs including a plurality of slits in opposed relationship, a support member comprising a film-like sheet material draped over the walls of the troughs and forming a floor therebetween, a plurality of partition members received within the opposed slits of the parallel troughs and transverse to the troughs and extending beyond the upper edges of the walls of the troughs, end plates secured to the ends of the partition members to define with the members and the sheet material an enclosed channel, the sheet material secured between the partition members and the slits receiving said members.

2. The device of claim 1 wherein the troughs are abutted one end to another end in longitudinal relationship to extend the lengths of said troughs.

3. The device of claim 2 wherein the troughs are secured in frictional engagement.

4. The device of claim 3 wherein the one end of a first trough is telescopically received in the other end of the next trough.

5. The device of claim 1 which includes a flange comprising two arms adapted to be received in the opposed slots of a trough and a strengthening rib, the rib adapted to abut the surface of an opposed partitioning member.

6. The device of claim 1 wherein the end plates are fluid permeable and each having a planar surface and two arms formed transversely to said surface said arms engaging slits of the trough and the planar surface forming the end of and closing a channel.

7. The device of claim 1 which includes a plurality of partition members defining growing channels and service channels in alternating relationship, the partition members between said channels being fluid permeable.

* * * * *